Dec. 2, 1952 A. R. BLACKBURN ET AL 2,619,702
MOLD
Filed Nov. 12, 1948
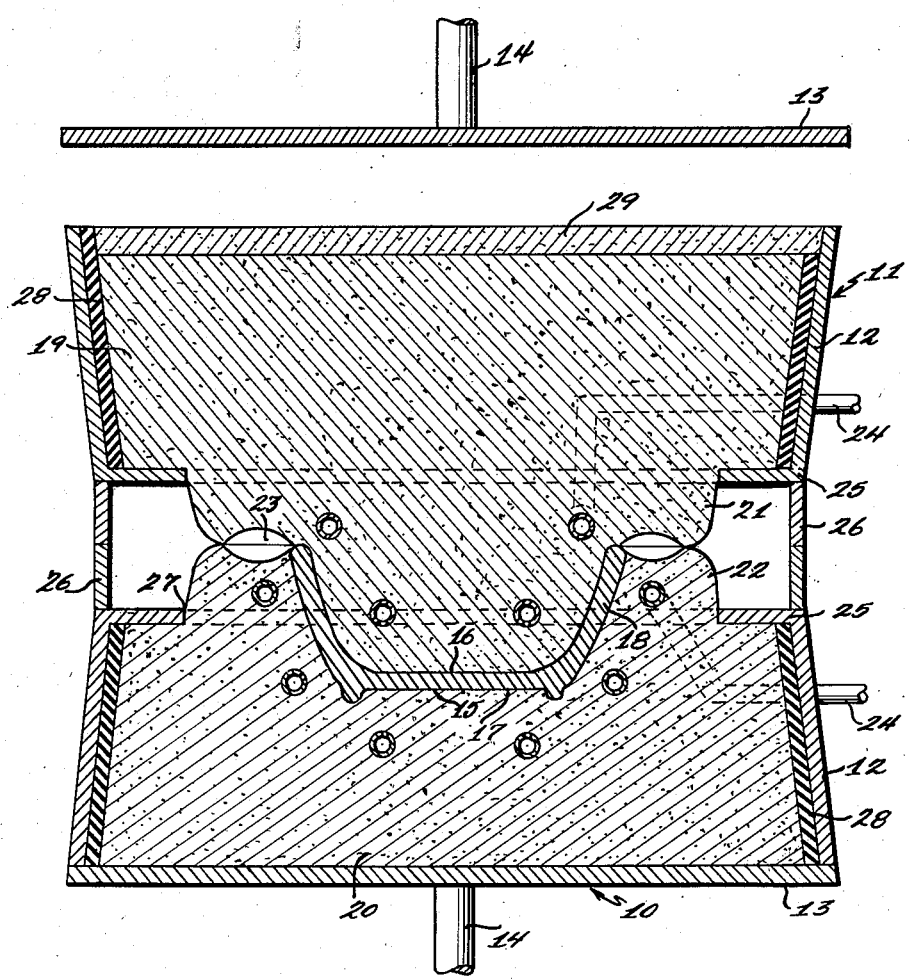
Inventors
ANDREW R. BLACKBURN
RICHARD E. STEELE
By
Semmes Keegin, Robinson Semmes
ATTORNEYS Patented Dec. 2, 1952

2,619,702

UNITED STATES PATENT OFFICE 2,619,702

MOLD

Andrew R. Blackburn and Richard E. Steele, Columbus, Ohio, assignors to Ram, Inc., Detroit, Mich.

Application November 12, 1948, Serial No. 59,493

6 Claims. (Cl. 25—129)

The present invention relates to improvements in molds for use in the manufacture of ceramic ware, and has particular reference to improvements in mold structures embodying a porous mold body set into a mold ring or other confining member whereby deformation and cracking of the mold body through expansion incident to hardening is avoided.

This invention is an improvement on the mold and method of manufacture thereof disclosed and claimed in application Serial No. 734,174, filed March 12, 1947, which has become Patent 2,584,109, the molds embodying a porous mold base provided with a pressure conduit embedded in the mold base for impressing a blanket of fluid pressure across the face of the mold to remove ware therefrom after a ware pressure forming operation. These molds are manufactured by first forming a plastic, wet mixture of gypsum or other material having the property of hardening upon setting to form a porous mold body. The plastic mixture is placed in the mold ring, and the pressure conduits embedded in the soft plaster by the mold maker in proper desired spaced relationship with the contour of the forming face of the mold. The molding face is impressed on the soft plaster with a suitable form, and the formed mold allowed to set until hardened.

It is important that the mold face be maintained free of cracks or other irregularities imparting imperfections to ware manufactured with the mold. This has been difficult to accomplish due to the tendency of soft plaster to expand upon hardening. This problem is accentuated in instances where a part of the mold face extends beyond the portion of the mold confined within the mold ring. The expansion forces in the body of plaster confined in the mold ring necessarily are impressed upon and absorbed by the unconfined portion of the mold body, resulting in the incurrence of cracks and seams in the mold face.

The principal object of the present invention is to provide a novel mold construction wherein the problem of irregular expansion of different portions of the mold body is eliminated.

A further object of the invention is to provide a method of forming molds whereby the differences in expansion characteristics of the mold body confined within the mold ring, and portions of the mold body extending beyond the mold ring, are compensated, thereby eliminating cracking of the molding surface during the hardening of the mold.

A further object is to provide a mold for use in the manufacture of ceramic ware embodying resilient cushioning means within the mold ring, capable of accommodating and absorbing the normal expansion of the confined portion of the mold body during formation of the mold body.

A further object of the invention is to provide a novel mold ring for use in combination with the said mold expansion absorbing member, whereby the mold body is firmly anchored within the mold ring.

A further object is to provide a novel mold retaining ring particularly adapted for use in connection with molds provided with fluid pressure means within the mold body for effecting the quick release of pressure formed ware from the mold face, whereby the effects of pressure normally tending to displace the mold body from the mold ring, are eliminated.

Yet a further object of the invention is to provide a mold ring for use in connection with porous mold bodies provided with fluid pressure means for effecting the release of ware from the mold face whereby the thrust of the pressure applied to the mold body serves to secure the mold body more firmly in fixed relationship with the mold ring, thereby preventing loosening of the mold body in the mold ring during the molding process.

Still a further object is to provide a novel method for forming the mold body within the mold ring, whereby the effects of expansion of the mold body during the hardening thereof are completely compensated for.

Other objects and advantages of the invention will be apparent in the following description thereof taken in connection with the drawing wherein there is shown a view in vertical section of the invention, showing the details of a porous mold embodying fluid pressure release members within the mold body and formed in accordance with the invention.

In its broadest application, the present invention provides a mold comprising a porous mold body formed of plaster, gypsum, or other conventional mold forming material characterized by the ability to harden upon setting from the wet or plastic state to provide a finely grained porous mold body. The mold is provided with means whereby the normal expansion of the wet plaster or gypsum experienced during the hardening process is evenly distributed throughout the mold body, whereby differential expansion of different portions of the mold body is avoided. This is accomplished by provision of a resilient cushioning member within the mold case or ring whereby the forces incident to expansion of the wet plaster are expended normally throughout the portion of the mold body encased and confined by the mold ring at the same rate of expansion as the portions of the mold body not enclosed by the mold ring. Movement of the mold body relative to the mold ring during the molding operation is eliminated by provision of a retaining member preventing relative axial movement of the mold body and the mold ring which might occur due to the presence of the resilient member mounted within the mold ring, and as a result of the application of fluid pressures to the mold body. The invention further provides a method of forming a mold of the type described, whereby a maximum of free expansion of the porous mold body is accomplished prior to completion of the mold body forming step and prior to closure of the mold casing whereby a minimum of stress and strain incident to the plaster hardening process is set up within the mold body.

Referring now to the drawing, numerals 10 and 11 refer to a male and female mold section respectively, each mold section embodying a mold ring 12 secured by screws or otherwise to a removable base plate 13. Each mold section 11 and 12 may be secured to a plunger 14 for vertical reciprocation of the mold sections in a pressure ware forming operation, in the usual manner.

The mold sections 11 and 12 are provided with opposed forming faces 15 and 16 of desired design co-acting in a pressure ware forming operation to form a molded object 17 shown for purposes of description as a dish embodying an extended substantially vertical side 18. The mold faces 15 and 16 are formed on porous mold bodies 19 and 20 carried for the most part confined within the mold rings 12 and base plate 13 of each mold section.

The mold rings and base plates preferably are secured in pressure tight relationship, whereby fluid pressure injected into the mold body must pass to the mold faces 15 and 16. It will be noted that each mold body 19 and 20 may be formed with mold extensions 21 and 22 respectively, rising vertically above the mold bodies 19 and 20, the sections 21 and 22 supporting the mold forming faces well above the mold sections 19 and 20 whereby in a ware forming operation, the mold rings are spaced considerably apart as shown. For purposes of catching any overflow of plastic clay in a ware pressing operation, a clay collecting cavity 23 may be provided on each mold face adjacent the vertical portion 18 of the molded object 17.

A fluid pressure release mechanism of the type disclosed and claimed in application Serial No. 734,174 may be provided in each of the mold sections 11 and 12, the mechanism generally comprising fluid pressure conduits 24 preshaped and carefully placed in the respective mold sections 11 and 12, the conduits being apertured along their lengths whereby fluid pressure may be impressed evenly across the molding faces 15 and 16 of the molds to effect a clean and complete separation of the ware from the faces of the molds subsequent to completion of the pressure forming operation.

In accordance with the present invention, the mold rings 12 are formed in cone-shaped cross section, tapering inwardly toward the mold faces 15 and 16, whereby the mold sections 19 and 20 are firmly secured in the enclosing mold rings. It will be noted that the fluid pressure which is impressed upon the mold sections 19 and 20 through the fluid pressure conduits 24, serves to drive the mold sections 19 and 20 more firmly into the tapered mold rings, thereby preventing loosening of the mold bodies relative to the mold rings during repeated pressure forming operations. Further means are provided for positively preventing the movement of the mold bodies axially relative to the mold rings, comprising a flange 25 secured to the top portion of the mold ring by welding or otherwise, securely anchoring the respective mold bodies 19 and 20 within the mold rings 12.

During a pressure forming operation, in order to prevent crushing of the mold sections 21 and 22 by the applications of an excessive forming pressure to the opposed mold sections 11 and 12, a plurality of spacer members 26 are positioned on the mold rings 12. The spacer members 26 are carefully adjusted whereby a fine degree of control of the forming pressures exerted on the ware 17 is attained. The spacer members 26 may be provided in any number desired, but conveniently may comprise four spacer members equally spaced about the periphery of the respective mold rings 12.

Formation of the mold sections 19 and 20 normally is accomplished by positioning of the respective mold rings with the tapered end down over master forms contoured in accordance with the desired design for the molding faces 15 and 16. Wet plastic gypsum may then be poured into the mold rings upon the master forms, being carefully applied thereon initially to insure the provision of a clean mold face free of imperfections. The fluid pressure conduit members 24, preshaped by the mold maker, are secured in the soft plaster so that the conduits are positioned to provide fluid pressure streams flowing generally perpendicularly to the planes of the contours of the mold faces 15 and 16 and in spaced relationship therewith, whereby a controlled blanket of fluid pressure may be impressed over the entire forming face of the mold to remove the formed object therefrom without distortion or cracking. The remaining portion of the wet plastic gypsum is then packed into the mold ring to entirely fill the mold ring, and the base plate 13 secured thereto. The mold is then set aside until the gypsum hardens, whereupon the mold is ready for use.

It will be readily observed that the wet gypsum contained within the confines of mold ring 12 and base plate 13 is confined against normal expansion during the hardening process, and that the expansion forces incident to the plaster hardening necessarily are dissipated along the vertical axis of the mold body in the direction of the portion of the mold body formed outside of the mold ring. Due to the difference in expansion characteristic of the mold bodies 19 and 20 and the sections 21 and 22 formed outside of the mold ring, forces are set up within the mold body in its entirety which inevitably result in cracking of the mold surfaces either during the hardening process or in use upon the application of ware forming pressures with the mold sections 11 and 12 to the plastic clay. This cracking normally occurs at the points 27 where the mold sections 21 and 22 extend beyond the retaining rings 25. Also, cracking of the mold bodies may occur in the more extended or raised portions of the mold sections 21 and 22, particularly in the male mold 21 adjacent the forming face 16.

In accordance with the present invention the difference in expansion characteristic of the mold sections 19 and 20 confined within the mold rings, and the mold sections 21 and 22 extending above the mold rings, is accomplished by the provision of a cushioning member 28 within each mold ring, the cushioning member preferably extending the entire length of the inner surface of the mold ring. The cushioning member 28 may be formed of any resilient material, preferably of a type capable of resisting chemical action, such as natural or artificial rubber. While it is preferred to use rubber for reasons of economy and availability, it will be readily apparent that this object of the invention will be accomplished by any material having resilient properties capable of absorbing expansion of the mold sections 19 and 20 incident to hardening and the invention is not to be limited as to the particular material employed in forming the member 28.

In using the cushioning member 28, the expansion forces generated in the mold sections 19 and 20 during hardening thereof are entirely absorbed within the mold ring 12, thereby eliminating the impression of undue strain on the mold sections 21 and 22 formed outside of the mold ring.

As shown in connection with mold section 11, stabilization of the mold hardening process may be further effected by partially filling the mold ring with wet plastic gypsum during the mold forming operation as an initial step, and allowing the hardening process to pass substantially to completion, whereby substantially all of the expansion forces normally generated during the hardening process are dissipated by expansion away from the molding face 16. When this is accomplished, a final layer of wet plastic gypsum 29 is placed over the partially hardened mold section 19 and levelled off to bring the porous mold body 19 flush with the bottom edge of the mold ring 12. The base plate 13 may then be attached to the ring 12 and the plaster layer 29 allowed to harden without danger of setting up undesirable expansion forces within the mold body.

While the invention has been described with reference to a mold section contained within the mold ring and having a portion extending beyond the surface thereof, it will be readily apparent that the principle of the present invention is equally applicable to molds wherein the entire mold body is contained within the mold ring, with only the mold face unconfined. In connection with this type of mold, the expansion forces incident to hardening of the plaster mold body are absorbed evenly by the resilient member 28, thereby eliminating the setting up of undesirable strains within the hardened mold body which normally result in cracking of the mold face adjacent the mold ring and in heaving or swelling of the central portion of the mold face.

The tapered mold rings considerably facilitate removal of the mold bodies from the mold casing, when it is desired to replace the mold bodies.

When the principles of the present invention are employed in the formation of molds, a more dense gypsum may be employed in forming the mold bodies without danger of cracking during formation of the molds. Also, the life of the molds is appreciably extended over the life of the conventional mold, and the amount of spoilage during formation of the molds due to the appearance of imperfections upon the forming faces as the mold hardens, is almost completely eliminated. The invention may be employed in connection with a single mold employed in a jiggering operation, as well as with two opposed molds used in a pressure forming operation.

While the invention has been described in connection with the specific embodiments shown, possible changes in construction details and materials employed from those described will be apparent to one skilled in the art. Accordingly, the invention is to be limited only as described in the appended claims.

We claim:

1. A mold for use in forming ceramic ware comprising a plaster mold body characterized by expansion upon hardening and having a ware forming face, sides and a base, a mold ring confining the mold body, a resilient member interposed between the sides of the plaster mold body and the mold ring, and a base plate on the mold ring resting adjacent the plaster mold base, whereby lateral expansion of the plaster as it hardens within the mold ring and base is absorbed by the resilient member, vertical expansion occurring normally in the direction of the mold face 2. In the mold structure set forth in claim 1, the mold ring being tapered inwardly in the direction of the mold face.

3. In the mold structure set forth in claim 1, a mold retaining member secured to the edge of the mold ring adjacent the forming face of the mold securing the mold body against axial movement relative to the mold ring.

4. A ceramic mold for use in forming ware comprising a plaster mold body having a molding face, a molding ring containing the molding body and tapered inwardly in the direction of the mold face, a resilient cushioning member interposed between the mold body and the mold ring and extending the length thereof, a base plate secured to the bottom of the mold ring and rigidly supporting the plaster mold body, and a mold retaining member secured to the inwardly tapered end of the mold ring, the retaining member and base plate preventing relative axial movement between the mold body and the mold ring.

5. A ceramic mold comprising a porous plaster mold body having a molding face, a pressure tight mold casing including a mold ring and a base plate confining the mold body with the exception of the mold face, a conduit embedded in the porous plaster mold body and connected with a source of fluid pressure for impressing a controlled blanket of fluid pressure across the mold face to remove formed ware therefrom, the mold ring being tapered inwardly towards the mold face, and a resilient cushioning member interposed between the plastic mold body and the mold ring for absorbing expansion forces incident to forming of the mold body in the mold case, the plaster mold body being supported directly by the mold base plate.

6. A mold for the pressing of plastic clay bodies to form ceramic ware comprising a permeable mold body of plaster of Paris and the like having a molding face of the desired contour, a rigid ring encircling the mold body, a perforated conduit embedded in the mold body for connection with a source of fluid pressure to remove pressed ware from the mold face, and a resilient deformable cushioning member between the mold body and ring for absorption of the compressive forces resulting from expansion of the plaster of Paris as it sets in the formation of the mold.

ANDREW R. BLACKBURN
RICHARD E. STEELE.

REFERENCES CITED

The following references are of record in the file of this patent:

UNITED STATES PATENTS

| Number | Name | Date |
|---|---|---|
| 1,365,753 | Vought | Jan. 18, 1921 |
| 1,592,536 | O'Neill | July 13, 1926 |
| 1,862,699 | Miller | June 14, 1932 |
| 1,902,627 | Elbogen | Mar. 21, 1933 |
| 2,040,732 | Foster | Mar. 12, 1936 |
| 2,177,461 | Ruthven | Oct. 24, 1939 |
| 2,192,183 | Deutsch | Mar. 5, 1940 |
| 2,201,037 | Hagemeyer | May 14, 1940 |
| 2,220,703 | Bean | Nov. 5, 1940 |
| 2,233,295 | Miller | Feb. 25, 1941 |
| 2,317,597 | Ford et al. | Apr. 27, 1943 |
| 2,352,083 | Detjen | June 20, 1944 |
| 2,464,029 | Ehrman | Mar. 8, 1949 |